United States Patent [19]
Sato

[11] Patent Number: 5,175,936
[45] Date of Patent: Jan. 5, 1993

[54] ELECTRONIC COMPASS

[75] Inventor: Hiroshi Sato, Fussa, Japan

[73] Assignee: Casio Computer Co., Ltd., Tokyo, Japan

[21] Appl. No.: 662,365

[22] Filed: Feb. 28, 1991

[30] Foreign Application Priority Data

Mar. 13, 1990 [JP] Japan .................... 2-60028

[51] Int. Cl.⁵ .................. G01C 17/28; G04B 47/06
[52] U.S. Cl. ........................ 33/354; 33/361; 368/10; 368/14
[58] Field of Search .......... 33/361, 355 R, 352, 33/334, 341, 349, 354; 368/10, 14, 11, 20

[56] References Cited

U.S. PATENT DOCUMENTS

| | | |
|---|---|---|
| 4,470,119 | 9/1984 | Hasebe et al. |
| 4,482,255 | 11/1984 | Gygax et al. ............ 368/10 |
| 4,668,100 | 5/1987 | Murakami et al. .......... 33/361 |
| 4,694,583 | 9/1987 | Blaney .................. 33/361 |
| 4,726,687 | 2/1988 | Gander ................... 368/10 |
| 4,791,729 | 12/1988 | Suda .................... 33/361 |

FOREIGN PATENT DOCUMENTS

| | | |
|---|---|---|
| 0069965 | 1/1983 | European Pat. Off. |
| 0078510 | 5/1983 | European Pat. Off. |
| 0280546A2 | 8/1988 | European Pat. Off. |
| 3224633 | 1/1983 | Fed. Rep. of Germany. |
| 0131714 | 10/1980 | Japan ................... 33/361 |
| 0135412 | 8/1983 | Japan ................... 33/361 |
| 0130310 | 6/1987 | Japan ................... 33/361 |
| 0130311 | 6/1987 | Japan ................... 33/361 |
| 0036185 | 2/1988 | Japan ................... 368/14 |
| WO85/05444 | 12/1985 | PCT Int'l Appl. |
| 0613832 | 10/1979 | Switzerland ............. 33/354 |
| 2081910 | 2/1982 | United Kingdom. |

Primary Examiner—Thomas B. Will
Attorney, Agent, or Firm—Frishauf, Holtz, Goodman & Woodward

[57] ABSTRACT

An electronic compass can store azimuth data of points to be passed by a user in a plurality of registers, and the stored azimuth data are sequentially displayed on a display device every time an external operation switch is operated. The compass includes a magnetic sensor for detecting a geomagnetism, thereby obtaining north azimuth data on the earth. The north azimuth data obtained by the magentic sensor is displayed simultaneously with the stored azimuth data. Therefore, the user can know at each point a direction to go on the basis of the two displayed azimuth data, i.e., the stored azimuth data, and the north azimuth data on the earth.

25 Claims, 7 Drawing Sheets

FIG.8

ELECTRONIC COMPASS

BACKGROUND OF THE INVENTION

1. Field of the Invention

The present invention relates to an electronic compass which comprises a magnetic sensor for detecting a geomagnetism to obtain azimuth data, and has a function of optically indicating a plurality of arbitrarily set azimuths on the basis of the azimuth data obtained by the magnetic sensor.

2. Description of the Related Art

In order to know a direction to move from a predetermined point to the next given point in a state wherein there is no index for discriminating an azimuth, a magnetic compass on which a magnetic needle is rotatably mounted to always direct "north" by a geomagnetism is used. An electronic compass is also known. In this compass, two magnetic sensors such as magnetoresistive elements, Hall elements, or the like are arranged to be perpendicular to each other, and "north" direction data is obtained on the basis of voltages generated by the magnetic sensors, and the "north" direction is indicated by an indication device.

When a person wants to sequentially pass a plurality of points in different directions using a compass of this type, e.g., from a point A to a point B, from the point B to a point C, from the point C to a point D,..., he first grasps a direction of the point B when viewed from the point A, e.g., data indicating an angle of direction offset from the "north" direction using, e.g., a map, and then detects an actual "north" direction at the point A using a compass. The person then detects an actual direction of the point B at the point A on the basis of the detected "north" direction, and data indicating an angle of direction of the point B offset from the "north" direction obtained using, e.g., the map, and moves in the detected direction.

When the person reaches the point B in this manner, he checks the map to know a direction of the point C when viewed from the point B, detects the actual "north" direction using the compass, then detects an actual direction of the point C, and moves in the direction.

In this manner, the person can sequentially pass a plurality of points in different directions, e.g., from the point A to the point B, from the point B to the point C, from the point C to the point D,..., using the map and the compass. In this method, however, the person must check a direction of the next target point using the map, and detect an azimuth using the compass, resulting in very cumbersome operations. These operations take much time, and if the person reaches a predetermined point, he cannot immediately move in the next direction. In particular, when so-called underwater navigation to move to some predetermined underwater points using, e.g., an aqualung is conducted, it is very cumbersome to check a map at the respective points.

SUMMARY OF THE INVENTION

The present invention has been made in consideration of the above situation, and has as its object to provide an electronic compass which can easily and quickly detect a plurality of directions.

In order to achieve the above object, according to the present invention, there is provided an electronic compass comprising:

azimuth indication means for indicating directions of all azimuths;

azimuth data storage means for storing a plurality of azimuth data;

read switch means for sequentially reading out the plurality of azimuth data stored in the azimuth data storage means;

azimuth detection means for detecting a predetermined azimuth on the earth; and azimuth data display means for simultaneously displaying the predetermined azimuth detected by the azimuth detection means, and the azimuth data read out from the azimuth data storage means in correspondence with all the azimuths indicated by the azimuth indication means.

With this arrangement, according to the present invention, the map need not be checked at respective points to verify a detected direction with the "north" direction, and the next direction to go can be detected by very simple switch operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
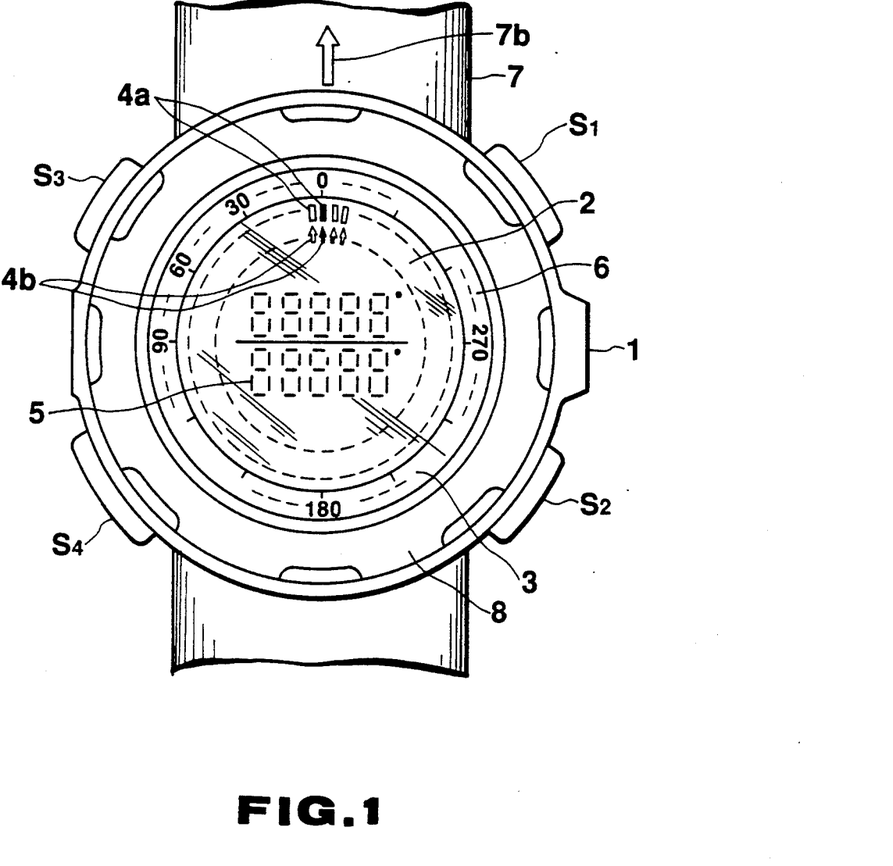
FIG. 1 is a front view showing an outer appearance of an electronic wristwatch assembled with a compass function according to an embodiment of the present invention.

An embodiment of the present invention will be described hereinafter. FIG. 1 shows an outer appearance of an electronic wristwatch comprising an electronic compass according to the present invention. In FIG. 1, a wristwatch main body case 1 houses a circular liquid crystal display device 2 at the center of its front surface portion, and an annular dial 6 arranged in contact with the outer surface of the liquid crystal display device 2. The case 1 also comprises a timepiece glass 3 for covering the dial 6, and a bezel 8 arranged outside the timepiece glass 3.

Two annular indication members are formed in the liquid crystal display device 2 at its outer peripheral portion and inner peripheral portion. The outer annular indication member is used to indicate a marker (to be described later), and includes, e.g., 120 dot indication elements, i.e., first indication elements 4a, which are radially arranged at equal angular intervals. The inner annular indication member is used to indicate an azimuth of "north" (to be described later), and includes, e.g., 120 dot indication elements, i.e., second indication elements 4b, which are radially arranged at equal angular intervals. Each first indication element 4a has a rectangular shape extending radially from an inner side toward an outer side of the liquid crystal display device 2, and each second indication element 4b has an arrow shape directing radially from an inner side toward an outer side. The first and second indication elements 4a and 4b are also used to indicate "second" of time, as will be described later. 10-digit segment display members 5 for displaying time and an azimuth are arranged at the central portion of the liquid crystal display device 2, so that they are juxtaposed in upper and lower columns in units of five segments.

Azimuth angle numerical values "0° ", "30° ", "60° ", "90° ",... are printed counterclockwise on the dial 6 at equal angular intervals for equally dividing the dial 6 into 12 sections together with scale marks, so that "0° " coincides with a direction of 12 o'clock. Furthermore, scale marks indicating further detailed azimuths are stamped at predetermined angular intervals between these numerical values representing the azimuth angles.

Four push-button type switches $S_1$, $S_2$, $S_3$, and $S_4$ for switching display modes, and setting or calling, e.g., an azimuth, are arranged on the side surface portion of the wristwatch main body case 1. Switches S1, S2 and S3, S4 are symmetric with respect to a line connecting "0° " and "180° ".

A band 7 to be worn on a wrist is mounted on the wristwatch main body case 1. An arrow-shaped rubber line (base line) 7b is printed on the upper surface of the band in a longitudinal direction of the band 7, so as to indicate a direction of 12 o'clock.

Figure 2:
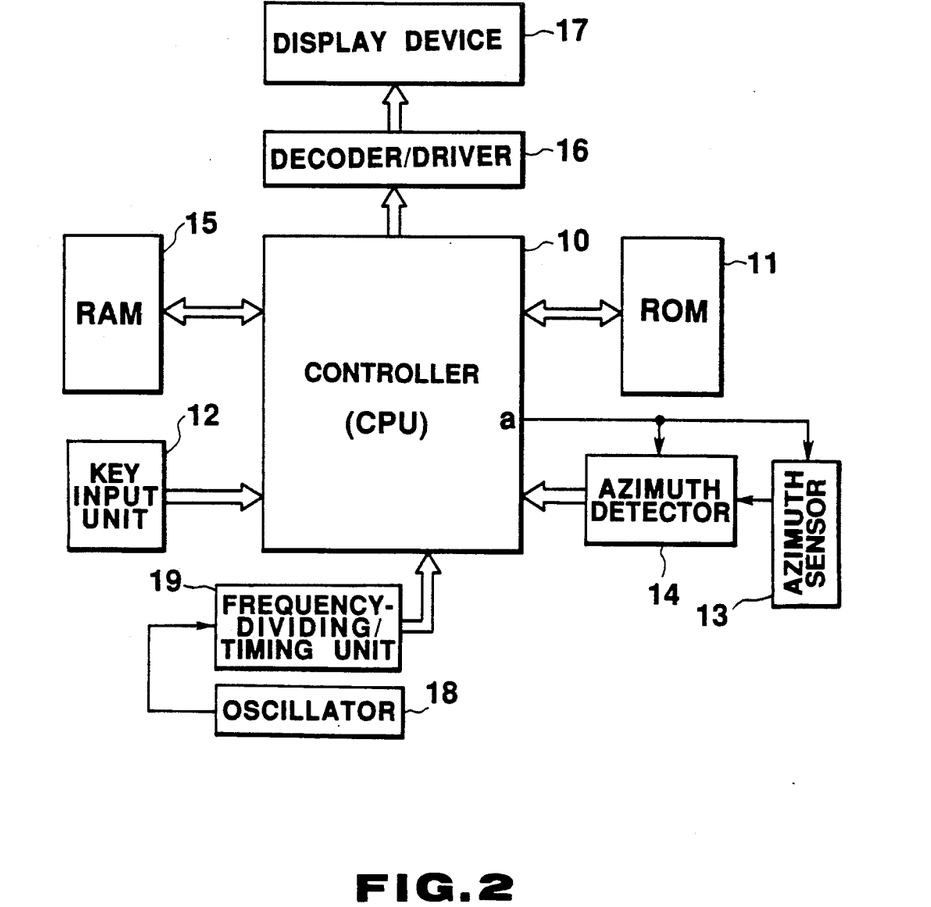
FIG. 2 is a block diagram showing an internal circuit of the wristwatch.

FIG. 2 is a block diagram showing an internal circuit of the wristwatch shown in FIG. 1.

In FIG. 2, a ROM (read only memory) 11 is a permanent memory which stores microprograms for controlling an entire system of FIG. 2, and data such as numerical values necessary for various arithmetic operations. A key input unit 12 comprises the four switches $S_1$ to $S_4$ described above with reference to FIG. 1, and outputs key operation signals of these four switches $S_1$ to $S_4$ to a controller 10.

The controller 10 comprises a CPU such as a microprocessor. The controller 10 is connected to respective blocks of FIG. 2, and controls the entire system on the basis of the programs stored in the ROM 11. When a signal input from the key input unit 12 is one for instructing measurement, indication, or the like of an azimuth, the controller 10 outputs an output signal a to start an azimuth sensor 13 and an azimuth detector 14. The controller 10 also executes timepiece processing on the basis of timepiece timing signals output from a frequency-dividing/timing unit 19 (to be described later).

The azimuth sensor 13 is started in response to the output signal a from the controller 10, and measures an azimuth. The azimuth sensor 13 includes, e.g., two Hall elements or two magnetoresistive elements. For example, the two Hall elements are formed to have equal characteristics, and are arranged in the wristwatch main body case 1 to be perpendicular to each other. The two Hall elements detect components of a geomagnetism, and output voltages corresponding to the detected magnetic components to the azimuth detector 14. The azimuth detector 14 is started in response to the output signal a from the controller 10. The detector 14 performs arithmetic operations on the basis of the intensities of the voltages input from the azimuth sensor 13 and the arranging directions of the two Hall elements to detect a vector indicating the north magnetic pole, and outputs azimuth data corresponding to the detected vector to the controller 10. The azimuth data is used to indicate a north azimuth. An oscillator 18 generates clock signals having predetermined periods, and outputs them to the frequency-dividing/timing unit 19. The frequency-dividing/timing unit 19 comprises a frequency divider and a timing generator, and outputs timepiece timing signals, and timing signals for time serially controlling respective blocks to the controller 10.

Figure 3:
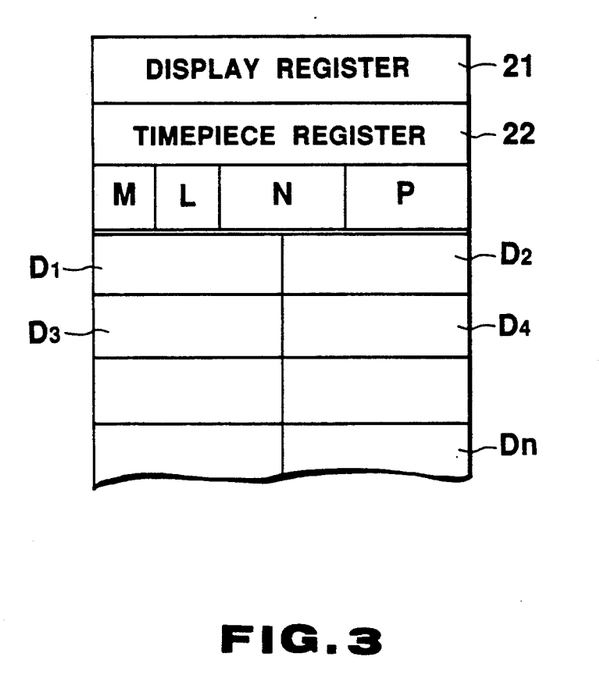
FIG. 3 shows a principal internal structure of a RAM 15 shown in FIG. 2.

A RAM (random access memory) 15 comprises registers for storing predetermined data, as shown in FIG. 3 (to be described in detail later). A decoder/driver 16 decodes a combination of signals input from the controller 10, and outputs a display drive signal to a display device 17. The display device 17 comprises the liquid crystal display device 2 described above with reference to FIG. 1, and performs a predetermined display on the liquid crystal display device 2 on the basis of the signal input from the decoder/driver 16.

FIG. 3 shows the principal internal structure of the RAM 15. In FIG. 3, a display register 21 stores display data to be displayed o the liquid crystal display device 2. A timepiece register 22 stores current time data measured on the basis of the timepiece timing signal output from the frequency-dividing/timing unit 19. A register M is a mode flag for storing values "0" to "2" in correspondence with three display modes (to be described later), i.e., a time display mode, an azimuth setting mode, and an azimuth display mode of the liquid crystal display device 2. A register L stores the number of operations of the switch $S_4$. A register N stores data indicating an angle of the north azimuth with respect to the position of "0° " printed on the dial 6. A register P is a pointer for storing an address of one of registers $D_1$ to $D_n$ for storing set azimuth data (to be described later).

The registers $D_1$ to $D_n$ respectively store a plurality of setup azimuth data.

Operations executed by the controller 10 in the above-mentioned arrangement will be described below with reference to the flow chart shown in FIG. 4, and the display state charts of FIGS. 5 to 6B.

Figure 4:
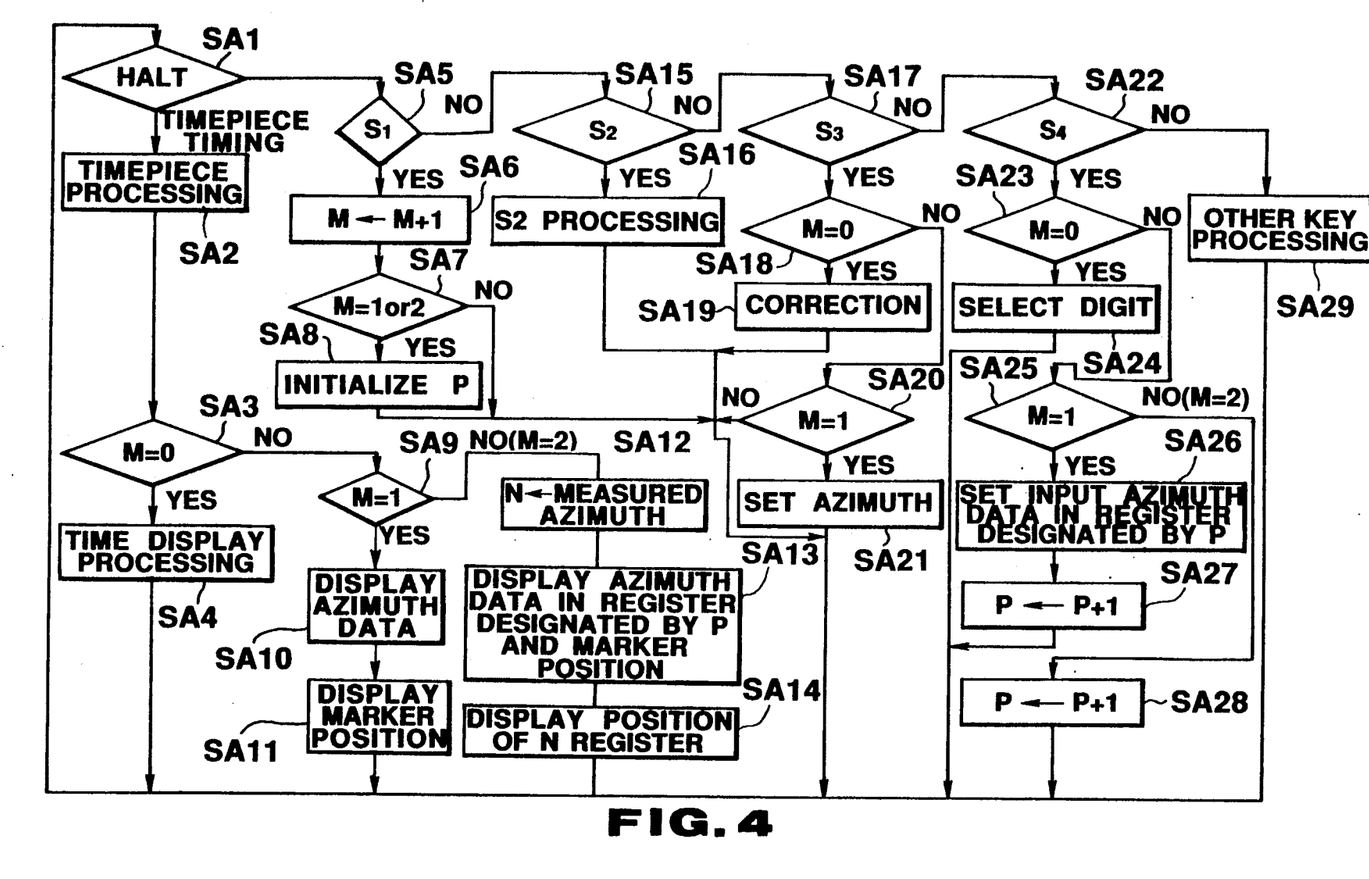
FIG. 4 is a flow chart showing the overall flow of a program of the circuit shown in FIG. 2.

FIG. 4 is a flow chart showing the overall flow of the program. When an input from the key input unit 12 is detected in a HALT state in step SA1, the flow advances to step SA5 (to be described later). When a timepiece timing signal having a predetermined period, e.g., 16 Hz, is input from the frequency-dividing/timing unit 19 to the controller 10 in step SA1, timepiece processing is executed in step SA2, and current time data is stored in the timepiece register 22 in the RAM 15. In step SA3, it is checked if the value stored in the register M is "0" indicating the time display mode. If YES in step SA3, the flow advances to step SA4. In step SA4, the time data in the timepiece register M is read out to execute time display processing for displaying time data using the segment display members 5, and the indication elements 4a and 4b of the liquid crystal display device 2, and the flow then returns to step SA1.

Figure 5:
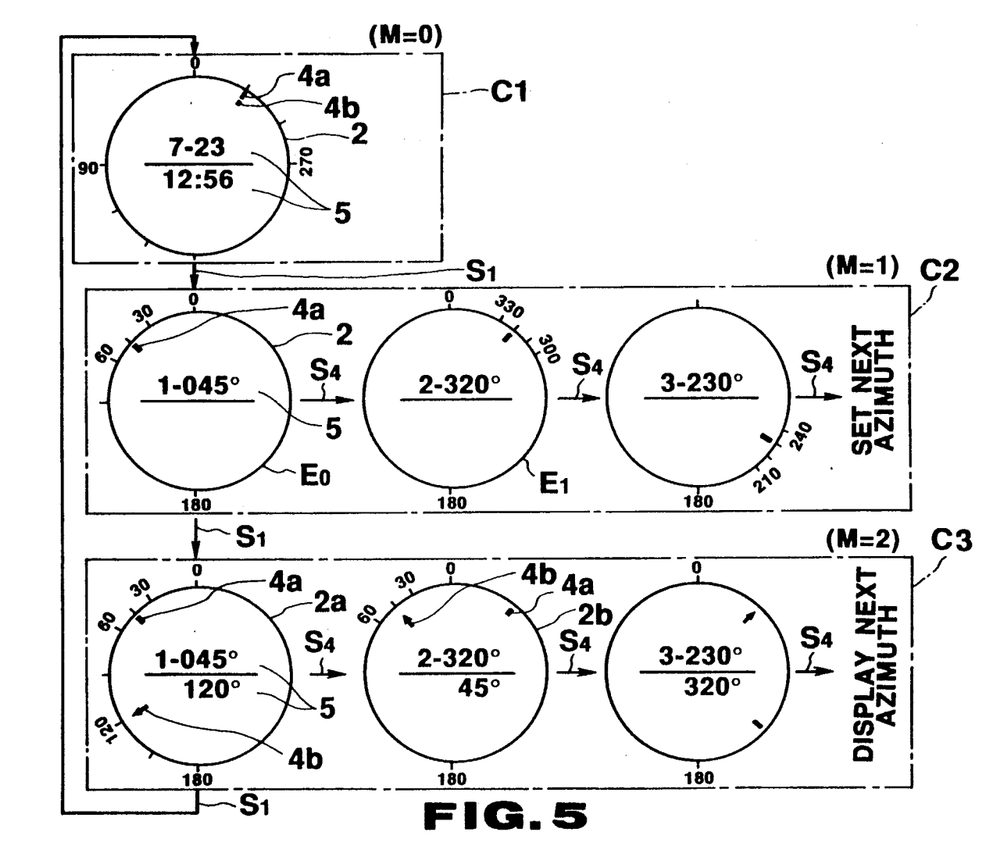
FIG. 5 is a chart for explaining display states indicating operation modes.

In FIG. 5, Cl represents a display state attained by the time display processing in step SA4 when the value of the register M is "0". In the time display mode, for example, current time "7 - 23 (Jul 23), 12 (hour): 56 (minutes)" is displayed on the segment display members 5 at the central portion of the liquid crystal display device 2, as shown in FIG. 5. The first and second indication elements 4a and 4b aligned in a given line are simultaneously turned on to indicate "second".

Referring back to FIG. 4, if it is determined in step SA3 that the value of the register M is not "0", the flow advances to step SA9 to check if the value of the register M is "1" indicating the azimuth setting mode. If YES in step SA9, the flow advances to step SA10, and setup azimuth data (to be described later), i.e., azimuth angle numerical value data is displayed. In step SA11, a marker is indicated by the first indication element 4a located at a position corresponding to the setup azimuth. Thereafter, the flow returns to step SA1. These display operations will be described later.

If it is determined in step SA9 that M≠"1", it is determined that M="2", and the flow advances to steps SA12 to SA14, as will be described later.

When an input from the key input unit 12 is detected in step SA1, the flow advances to step SA5 to check if the input is based on a key input of the switch $S_1$. If YES in step SA5, the flow advances to step SA6, and the content of the register M is incremented by "1" to set a flag indicating the next mode. In step SA7, it is checked if the value of the register M is "1" or "2". If NO in step SA7, M = "0" is set in response to an input of the switch $S_1$ key. In this case, the flow returns to step SA1. If it is determined in step SA7 that the value of the register M is "1" or "2", the flow advances to step SA8, and the register P for setting an address of one of the registers $D_1$ to $D_n$ for storing setup azimuth data is cleared, i.e., initialized, so that an azimuth setup or display operation in the following processing steps can be started from the first register $D_1$. Thereafter, the flow returns to step SA1.

If it is determined in step SA5 that the input from the key input unit 12 is not based on the key input of the switch $S_1$, the flow advances to step S15 to check if the input is based on a key input of the switch $S_2$. If YES in step SA15, the flow advances to step SA16, and processing according to the key input of the switch $S_2$, i.e., processing for setting or canceling a time correction mode after it is determined that the time display mode of M="0" is set (although details are not shown), is executed. Thereafter, the flow returns to step SA1. If it is determined in step SA15 that the input is not based on the key input of the switch $S_2$, the flow advances to step SA17 to check if the input is based on a key input of the switch $S_3$. If YES in step SA17, the flow advances to step SA18 to check if the value of the register M is "0". If YES in step SA18, the flow advances to step SA19, and time correction processing of a time unit digit selected in step SA24 (to be described later) is executed. Thereafter, the flow returns to step SA1. If it is determined in step SA18 that the value of the register M is not "0", the flow advances to step SA20 to check if the value of the register M is "1". If YES in step SA20, since the azimuth setting mode is selected, the flow advances to step SA21, and azimuth data setting processing, i.e., processing for sequentially incrementing azimuth angle numerical value data by "+1" in the display register 21, is executed. Thereafter, the flow returns to step SA1.

Figure 7:
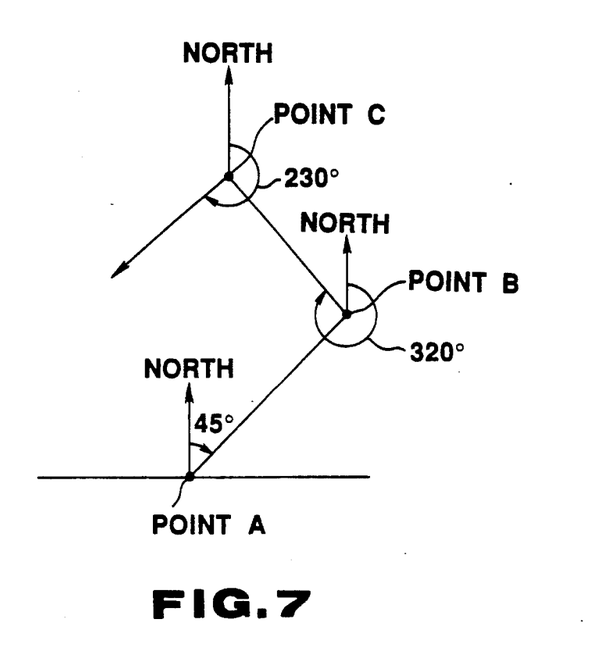
FIG. 7 is a view indicating points to go using the wristwatch of the present invention.

FIG. 7 shows directions when a person moves to a plurality of points, i.e., points A, B, C,... using the electronic compass according to the present invention. In FIG. 7, the "north" azimuth is assumed to be an upward direction in the drawing. As shown in FIG. 7, a person moves from the point A as a starting point toward the point B located in a direction of "45° " with respect to the "north" direction. After the person reaches the point B, he or she moves from the point B to the point C located in a direction of "320° " with respect to the "north" direction. After the person reaches the point C, he further moves from the point C toward the next point located in a direction of "230° " with respect to the "north" direction.

In this case, azimuth angle numerical value data "45° " is set and stored in the first register $D_1$, azimuth angle numerical value data "320° " is set and stored in the second register $D_2$, and azimuth angle numerical value data "230° " is set and stored in the third register $D_3$.

In FIG. 5, C2 represents display states in the azimuth setting mode when M=1. More specifically, when the switch $S_1$ is operated in the time display mode in Cl of FIG. 5, it is determined in step SA6 in FIG. 4 that M="1", and the flow advances to steps SA7 and SA8 to initialize the register P. Thus, the first register $D_1$ is addressed. When M="1", this state is detected in step SA9, and azimuth data, i.e., azimuth angle numerical value data set in the display register 21 by the switch $S_3$ is displayed in step SA10, and is then indicated as a marker by the first indication elements 4a in step SA11. In a display state E0 of the liquid crystal display device 2 at the left end of C2, "1–45° " representing that the first azimuth angle numerical value set in step SA21 is "45° " is displayed by the segment display members 5 in the upper column, and a marker is indicated by the first indication element 4a at a position opposing the middle of "30° " and "60° ", i.e., "45° " as the setup azimuth when "0" on the dial 6 is defined as the north azimuth. When a key input of the switch S4 is made, the azimuth angle numerical value "45° " of the setup azimuth is stored in the first register D1, and the control advances to azimuth setting processing of the second register $D_2$. In the illustrated case, the azimuth angle numerical value of the azimuth to be set in the second register $D_2$ is "320° ", and the azimuth angle numerical value of the azimuth to be set in the third register $D_3$ is "230° ".

More specifically, if it is determined in step SA17 that the key input of the switch $S_3$ is not detected, the flow advances to step SA22 to check if the input is based on a key input of the switch $S_4$. If YES in step SA22, the flow advances to step SA23 to check if the value of the register M is "0". If YES in step SA23, the flow advances to step SA24, and a digit to be corrected of numerical values which display time is selected. Thereafter, the flow returns to step SA1. If it is determined in step SA23 that the value of the register M is not "0", the flow advances to step SA25 to check if the value of the register M is "1". If YES in step SA25, the flow advances to step SA26. In step SA26, the azimuth set in step SA21 is stored in a register designated by the value of the register P (in this case, the register D1). In step SA27, the content of the register P is incremented by "1" to address the next register $D_2$ by the register P. Thereafter, the flow returns to step SA1.

When the switch $S_3$ is then operated, the next azimuth angle numerical value data "320°" is set in the display register 21 in step SA21, so that "2-320°" is displayed, as shown in a display state $E_1$ in C2 of FIG. 5. When the switch $S_4$ is then operated, the azimuth data "320°" set in step SA21 is stored in the register $D_2$ designated by the value of the register P in step SA26. In step SA27, the content of the register P is incremented by "1" to address the next register $D_3$. Thereafter, the flow returns to step SA1. In this manner, the azimuth data are sequentially set in the registers $D_1$ to $D_n$. In this case, the content of the register L is incremented by "1" every time the switch $S_4$ is operated. As a result, the number of setup azimuth data is stored in the register L. If it is determined in step SA25 that the value of the register M is not "1", since M="2", the flow advances to step SA28, and the content of the register P is incremented by "1" to sequentially address the registers $D_1$ to $D_n$. With this addressing, the setup azimuth angles are sequentially displayed in the azimuth display mode of M="2", as will be described later.

In step SA28, after the content of the register P is incremented by "1", the incremented content is compared with the value of the register L although not shown. After the last setup azimuth data is displayed, the address is returned to the first register $D_1$ upon the next operation of the switch $S_4$. If it is determined in step SA22 that the input is not based on the key input of the switch $S_4$, the flow advances to step SA29. Processing in step SA29 includes setting processing for setting an alarm, a stopwatch, and the like in association with other timepiece functions, or alarming processing. When this processing is ended, the flow returns to step SA1.

As shown in FIG. 7, when a person moves from the point A to the point B at "45°" from the north, from the point B to the point C at "320°", and then in the direction of "230°", the azimuth angle numerical values "45°", "320°", and "230°" in moving directions are set in the registers $D_1$, $D_2$, and $D_3$, as shown in the setting mode in C2 of FIG. 5. When the switch $S_1$ is operated in this setting mode, M="2" is determined in step SA6 in FIG. 4, and the register P is initialized to address the register $D_1$. Since M="2", the flow advances to step SA12 via steps SA3 and SA9 after the operation of the switch $S_1$. In step SA12, the controller 10 outputs the signals a at every second to measure the "north" azimuth data, and the measurement data are stored in the register N. In step SA13, the value of a register designated by the register P, i.e., the register $D_1$, and its marker position are displayed. In step SA14, the position in the N register, i.e., the north azimuth is indicated by the second indication element 4b. Therefore, when the mode is switched from the setting mode of M="1" to the azimuth display mode of M="2" at the point A, a display state at the left end in C3 of FIG. 5 is attained. More specifically, at this time, the direction of the wristwatch is unknown. However, for example, when the direction of 12 o'clock of the wristwatch corresponds to a direction of "120°" from the north azimuth, the indication element 4b in the direction of "120°" is turned on to indicate the north azimuth, as shown in FIG. 6A.

Figure 6A:
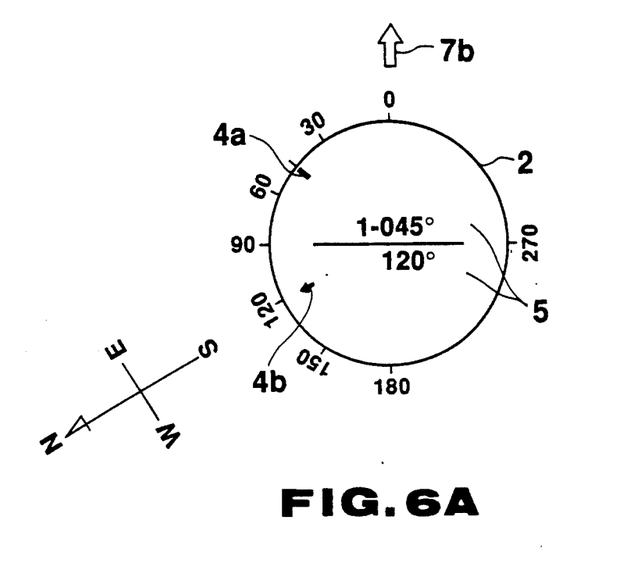
FIGS. 6A and 6B are views showing display states for explaining the way of use of the wristwatch.

More specifically, as shown in FIG. 6A, "45°" set in the register $D_1$ is displayed by the segment display members 5 in the upper column, and the marker indication element 4a located at a scale mark position of "45°" and the indication element 4b indicating the north direction are turned on. The azimuth angle numerical value "120°" indicating a direction of the ON indication element 4b with respect to the direction of 12 o'clock of the wristwatch is displayed by the segment display members 5 in the lower column.

Figure 6B:
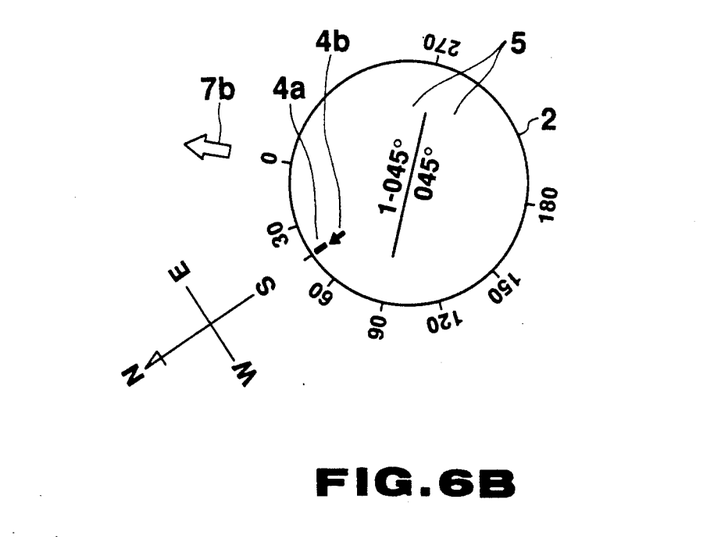

Thus, since a user of this wristwatch wants to move to the point B in the azimuth of "45°" with respect to the north, he turns the wristwatch main body case 1, i.e., in practice, the user himself who wears the wristwatch main body case 1 on his wrist turns, so that he faces the direction of 12 o'clock, and then turns to the left while visually observing the wristwatch main body case 1, so that the marker indication of the first indication element 4a coincides with the second indication element 4b indicating the north azimuth, as shown in FIG. 6B. As a result, a direction indicated by the rubber line 7b indicates an azimuth of "45°" with respect to the north, i.e., the direction of the point B. The direction obtained in this manner corresponds to the front of the user, as can be seen from the above-mentioned motion of the user. Thus, the user need only go forward to reach the point B.

When the user operates the switch $S_4$ when he reaches the point B, the next register, i.e., the register $D_2$ is addressed in step SA28 in FIG. 4, data "320°" set in the register $D_2$, and its marker indication element 4a are displayed, as shown in a display state 2b in C3 of FIG. 5. When the user moves such that the direction of "45°" with respect to the north corresponds to the direction of 12 o'clock, and he does not change the direction at the point B upon operation of the switch $S_4$, the indication member 4b corresponding to the scale mark of "45°" is still displayed as the north azimuth indication. More specifically, a display state 2b in C3 of FIG. 5 is attained. At the point B, the user turns his body and the wristwatch, so that the ON indication member 4a coincides with the ON indication member 4b. Thus, although not shown, the direction of 12 o'clock coincides with the direction of "320°", and when the user moves in the direction of 12 o'clock, he can reach the point C.

When the user reaches the next point C, he operates the switch $S_4$ to display data set in the next register $D_3$, the marker, and the north azimuth, as shown in a display state 2c in C3 of FIG. 5. When the user turns the wristwatch to cause the marker to coincide with the north azimuth, he can know the direction of "230°".

In this manner, in the above embodiment, azimuth data in moving directions are stored in advance, and every time a user reaches desired point, the stored azimuth data are sequentially displayed upon operation of the switch. Thus, the user can immediately know the moving direction by only operating once the switch at each point.

Figure 8:
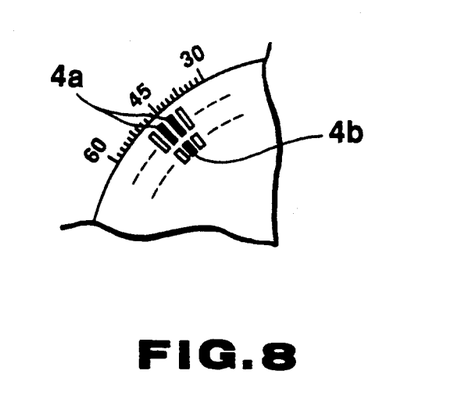
FIG. 8 is a view showing a display of another embodiment of the present invention.

In the above embodiment, the present invention is applied to the electronic wristwatch. However, the present invention is not limited to the above embodiment. For example, the present invention may be arranged as a special-purpose device, or may be assembled in compact equipments such as an electronic notebook, a schedular, and the like, or vehicles such as an automobile and a bicycle. Thus, various other applications are available. In addition, the marker indication and the north azimuth may be displayed as follows. For example, as shown in FIG. 8, the second indication elements 4b for indicating north azimuth may be arranged between two adjacent ones of the first indication elements 4a for indicating the marker, so that the marker indication ma be performed by turning on the two indication elements 4a, 4a, and the north azimuth indication may be performed by one indication element 4b between the two ON indication elements 4a, 4a. The azimuths may be displayed not by degrees but by angle characters such as N, S, W, E, NNW, SSE, etc. Furthermore, in the above embodiment, various displays are made using the first and second indication members 4a and 4b, and the segment display members 5. Alternatively, all the display operations may be made using dot matrix display members arranged on the entire surface of the liquid crystal display device 2. Moreover, data may be displayed not optically by the liquid crystal display device but by arranging needle indication means which are rotated by a driving operation of, e.g., a stepping motor. In this case, hour, minute, and second hands for indicating time may be used.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic compass comprising:
   azimuth indication means for indicating directions of all azimuths;
   specifying means for specifying a particular azimuth of all azimuths which can be specified by the specifying means;
   azimuth detection means for detecting a predetermined azimuth on the earth;
   azimuth data storage means for storing a plurality of azimuth data measured with respect to the predetermined azimuth on the earth;
   read switch means for sequentially reading out the plurality of azimuth data stored in said aid azimuth data storage means; and
   azimuth data display control means for simultaneously displaying the predetermined azimuth detected by said azimuth detection means, and an azimuth angled by a degree corresponding to the azimuth data read out by said read switch means with respect to the particular azimuth specified by said specifying means, on the azimuth indication means.

2. An electronic compass according to claim 1, further comprising an all azimuth data display means, for displaying all azimuths by azimuth angle value, provided around said azimuth indication means.

3. An electronic compass according to claim 2, wherein the azimuth angle values indicate numerical values at at least 30° intervals.

4. An electronic compass according to claim 1, wherein said azimuth detection means comprises:
   a magnetic sensor; and
   "north" azimuth detection means for detecting a "north" azimuth as the predetermined azimuth.

5. An electronic compass according to claim 1, wherein said azimuth indication means includes:
   a large number of first indication elements for indicating the predetermined azimuth detected by said azimuth detecting means; and
   a large number of second indication elements, arranged in correspondence with said large number of first indication elements, for indicating an azimuth angled by a degree corresponding to the azimuth data read out by said read switch means with respect to the particular azimuth.

6. An electronic compass according to claim 5, wherein the numbers of said first and second indication elements are integer multiples of 60, respectively.

7. An electronic compass according to claim 1, further comprising numerical value displaying means for displaying azimuth data stored in said azimuth storage means in numerical values.

8. An electronic compass comprising:
   an equipment case including a specific direction indication section for specifying a particular direction;
   a large number of dot type display members arranged in said equipment case, each of which can specify directions of all azimuths;
   azimuth detecting means for detecting a predetermined azimuth on the earth;
   angle data storage means for storing a plurality of angle data each data measured with respect to said particular direction;
   read switch means for sequentially reading out the plurality of angle data stored in said angle data storage means; and
   azimuth data display control means for simultaneously displaying the predetermined azimuth detected by said azimuth detecting means, and an azimuth angled by a degree corresponding to the angle data read out by said read switch means with respect to the particular direction, on said dot type display members.

9. An electronic compass according to claim 8, wherein said azimuth indication section arranged on said equipment case includes azimuth angle value data arranged around said large number of dot type display members.

10. An electronic compass according to claim 9, wherein the azimuth angle values indicate numerical values at at least 30° intervals.

11. An electronic compass according to claim 8, wherein said azimuth detecting means comprises:
    a magnetic sensor; and
    "north" azimuth detecting means for detecting a "north" azimuth as the predetermined azimuth.

12. An electronic compass according to claim 8, wherein said large number of dot type display members includes:
    a large number of first indication elements for indicating the predetermined azimuth detected by said azimuth detecting means; and
    a large number of second indication elements, arranged in correspondence with said large number of first indication elements, for indicating an azimuth angled by a degree corresponding to the azimuth data read out by said read switch means with respect to the particular azimuth.

13. An electronic compass according to claim 12, wherein the numbers of said first and second indication elements are integer multiples of 60, respectively.

14. An electronic compass according to claim 8, further comprising numerical value displaying means for displaying angle data stored in said angle storage means in numerical values.

15. A wristwatch type electronic compass comprising:
    a wristwatch type equipment case worn on a wrist;
    indication means for indicating a direction of 12 o'clock on said wristwatch type equipment case;

azimuth angle value indication means for indicating azimuth angle values to have the direction of 12 o'clock indicated by said indication means as 0°;

azimuth indication means arranged in correspondence with the azimuth angle values indicated by said azimuth angle value indication means;

azimuth data input means for inputting azimuth data;

azimuth data storage means for storing the azimuth data input by said azimuth data input means;

azimuth detection means for detecting a predetermined azimuth on the earth; and azimuth data indication control means for causing said azimuth indication means to simultaneously indicate the predetermined azimuth detected by said azimuth detection means and the azimuth data stored in said azimuth data storage means.

16. A compass according to claim 15, wherein said azimuth angle value indication means indicates angle values which are sequentially incremented counterclockwise to have the direction of 12 o'clock as 0°.

17. A compass according to claim 16, wherein the angle values indicate numerical values at at least 30° intervals.

18. A compass according to claim 15, wherein said azimuth detection means comprises a magnetic sensor, and "north" azimuth detection means for detecting a "north" azimuth as the predetermined azimuth on the basis of an output signal from said magnetic sensor.

19. A compass according to claim 15, wherein said azimuth indication means includes a large number of first indication elements for indicating the predetermined azimuth detected by said azimuth detection means, and a large number of second indication elements, arranged in correspondence with said large number of first indication elements, for indicating the azimuth data read out from said azimuth data storage means.

20. A compass according to claim 19, wherein the numbers of said first and second indication elements are integer multiples of 60, respectively.

21. A compass according to claim 15, further comprising numerical value display means for displaying the azimuth data stored in said azimuth data storage means as a numerical value.

22. A compass according to claim 15, wherein said azimuth detection means comprises a magnetic sensor, and "north" azimuth detection means for detecting a "north" azimuth as the predetermined azimuth on the basis of an output signal from said magnetic sensor, and said input means comprises means for inputting azimuth difference data with respect to the "north" azimuth as the azimuth data.

23. A compass according to claim 22, wherein the azimuth difference data is azimuth angle value data when the north azimuth is defined as 0°.

24. A compass according to claim 15, wherein said azimuth data storage means comprises a plurality of storage areas for storing azimuth data, respectively, and said compass further comprises external operation switch means for causing said azimuth indication means to sequentially indicate the azimuth data stored in said plurality of storage areas.

25. A compass according to claim 15, further comprising timepiece means for measuring current time, and current time display means for displaying the current time measured by said timepiece means.

* * * * *